Figure 1:
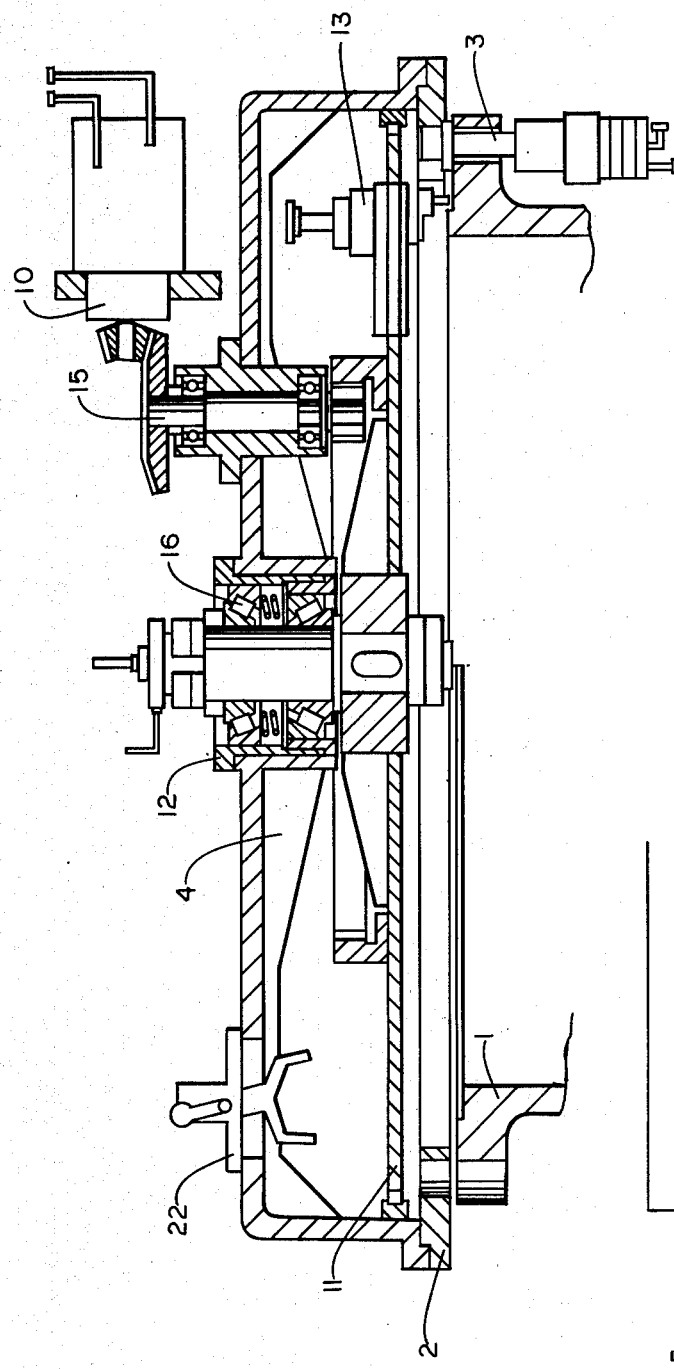

United States Patent [19]

Hartmann et al.

[11] 4,314,491
[45] Feb. 9, 1982

[54] PORTABLE SPECIAL LATHE FOR FLANGES OF LARGE DIMENSIONS

[75] Inventors: Willi Hartmann, Hoyerswerda; Klaus Huth, Hoyerswerda, both of German Democratic Rep.

[73] Assignee: Veb Gaskombinat Schwarze Pumpe, Schwarze Pumpe, German Democratic Rep.

[21] Appl. No.: 46,497

[22] Filed: Jun. 7, 1979

[30] Foreign Application Priority Data

Jun. 22, 1978 [DD] German Democratic Rep. ... 206199

[51] Int. Cl.³ .............................................. B23B 5/00
[52] U.S. Cl. ........................................ 82/4 R; 82/4 C
[58] Field of Search ................ 256/504; 82/4 C, 4 R; 313/224

[56] References Cited

U.S. PATENT DOCUMENTS

| 2,114,173 | 4/1938 | Boerstler | 250/504 |
| 2,275,745 | 3/1942 | Eastman | 250/504 |
| 2,283,323 | 5/1942 | Erhardt | 82/4 R |
| 3,141,365 | 7/1964 | Peters | 82/4 C |
| 3,273,432 | 9/1966 | Hasund | 82/4 R |
| 3,630,109 | 12/1971 | MacMichael | 82/4 C |
| 4,125,775 | 11/1978 | Chodak | 250/504 |
| 4,126,065 | 11/1978 | Clavin | 82/4 C |
| 4,167,669 | 9/1979 | Panico | 250/504 |
| 4,186,630 | 2/1980 | Lindhag | 82/4 C |

Primary Examiner—Leonidas Vlachos
Attorney, Agent, or Firm—Michael J. Striker

[57] ABSTRACT

Apparatus for facing sealing faces on flanges in situ and including means for mounting and locating the apparatus on the component to be machined comprising a housing with a machine unit, centering flange, intermediate flange, rotating turntable with tool and holder, drive means and a clamping system for connecting the intermediate flange to the workpiece.

9 Claims, 5 Drawing Figures

PORTABLE SPECIAL LATHE FOR FLANGES OF LARGE DIMENSIONS

FIELD OF APPLICATION OF THE INVENTION

This invention relates to a portable special lathe for the machining of sealing faces on flanges which, on account of their large dimensions, cannot be removed, or where their removal, from their location is not practical due to other reasons. Flanges of that size are present in large quantities particularly in coal refining plants as well as in chemical plants. The, in the main corrosive, influences of media or the environment, will, however, just at such locations, bring about rapid wear of the sealing faces. Lacking suitable special lathes, the flange components must be removed, transported to the repair workshops, machined there, and then again brought to the site and installed. With flanges of the dimensions of $D > 1,000$ mm, this method is extremely complicated and, in many cases, could not even be practiced. Due to space limitations, such cases necessitate considerable measures to be taken in respect of the installation concerned, in order to exchange the respective components or to remove these for repairs. Apart from the expenditure in respect of these maintenance methods, reductions in production will be unavoidable, exceeding by far those encountered in cases of normal repairs.

CHARACTERISTICS OF KNOWN TECHNICAL SOLUTIONS

Devices for lathe-type machining of components that are not removed, have already become known. One of these is provided with a rotating outrigger or with a rotating plate fitted with a tool holder, and serves for the machining of flange faces, especially pipe faces, of smaller dimensions, i.e., in the range of 500 mm. With this machine, the feed is accomplished by means of a star wheel.

Large in situ equipment for the machining of pipe-faces, using internal clamping of the pipe and a rotating bell fitted with tool holders, is also already known and used on jobsites. Also, special devices for the machining of components in circular shape or of pipes, have also been proposed, being suitable for very large, as well as for small, components. The construction of the device for the reworking of very large components, preferably circular components of strip-mining equipment, will entail the construction of a circular guide-track ring consisting of segments, with a rotating tool holder and a drive connected to the tool holder via an outrigger.

For the machining of small work-piece diameters, these devices are equipped with expanding clamping devices and work-piece supports arranged on outriggers.

Furthermore, devices exist, with preferably a horizontal working axis, for work pieces with an undulating surface as well as for the boring of work pieces.

These known devices, described above as to their operating principle, are, in respect of their geometrical application, suitable for the machining of small diameters as well as as special devices for selected machining requirements, inclusive of very large diameters.

However, due to the specific technological solution as to their geometry, they do not allow general application in respect of the machining of sealing faces of intermediate to large diameters on components that are not removed. In the respective instances, the known devices lack to the greatest extent the sum total of the required technical features regarding the main shaft bearings, the cutting speed, the required rigidity of the main drive, and the machine system of a machine for rotary cutting, as can clearly be seen from the example of the device with a rotating outrigger and tool holder, as described. Adjusting and attaching of the device to the components to be machined, is thus, of necessity, reserved for special machining tasks, as can be seen from the example of the device with a stand pipe and related interior pipe clamping.

OBJECTIVE OF THE INVENTION

It is the objective of the invention to create a portable special lathe of a specific limited geometrical dimension of construction, as well as of relatively small weight, which is to serve for the machining of flange sealing faces of intermediate to large diameters, for components that are not removed. By this, the expenditure required for such repairs can be reduced to a considerable extent and at the same time, reductions in production will be lessened.

EXPLANATION OF THE NATURE OF THE INVENTION

This invention is based upon the task of avoiding the removal of flanges with large dimensions, hitherto necessary in order to transport these for machining on a lathe in a repair shop.

The concept of the construction of the device as per invention, is to be solved in respect of handling, adjusting and installing on the component to be machined, by means of geometrically simple systems. At the same time, as can be deduced from the aforenamed setting of objectives for the invention, machining is to be made in any given position of the axis of rotation, including the overhead position, and it is also to be made on sealing faces designed with projections and recesses, or with a tenon and mortise. Defined sequences for the tool movements in the radial and axial direction are the result of having as set task the machining of projections. Contrary to the devices already known, it is the task of the invention to adapt the cutting speed in order to control the cutting process for the trimming of damaged sealing faces with welded-on metal deposits, as well as of welded-on flanges. Furthermore, construction of the device as per invention must ensure adjusting and attaching of the machining device onto the flanged component to be worked, irrespective of geometrical irregularities that may be present.

As per invention, the task is solved by arranging in situ, immediately at the flange to be worked, a special lathe suitable for the flange size to be machined, by assembling it from the portable system units, namely an intermediate flange with clamping system, the machine with the drive and also with the rotating turntable with the tool holder and a hydraulic unit. The intermediate flange is geometrically co-ordinated with the flange to be worked, and on its side facing the work piece support, points in the form of adjustable spacer bolts are arranged by which coupling to the work piece is effected. In its upper section, such a spacer bolt has an external thread which is screwed into the intermediate flange. Below it, an annular groove is arranged, within which spacers are placed to have a support by points on the work piece. In the extension of these elements, engaging the fastening holes present in the work piece, a T slot is arranged to accommodate the hydraulic clamping system. A clamping sleeve which, in conjunction with the spacers and the external thread of the element, accomplishes the connection intermediate flange-work piece, is rigidly attached to the cylinder of the system. The side of the intermediate flange away from the work piece, is provided on its face with a stepped-plane surface to allow centering of the machine.

The intermediate flange has circumferentially arranged threaded bolts, serving for a positive connection to the machine. Resulting from its function, the machine is designed with rotational symmetry, consisting of a light metal casting having a flange extension to allow attaching to the intermediate flange with which, therefore, the machine is coordinated geometrically.

The housing contains the support for the main shaft, in which the drive shaft for the turntable is arranged. Supporting of the drive shaft is made here preferably by spring-loaded tapered roller bearings. For the drive of the turntable, a hydraulic motor with a mechanical transmission is located on the housing of the machine.

The tool holder, located in a double guide-groove of V section on the turntable, is located there according to the diameter range within which work is to be done.

The radial feed movement of the tool holder is generated by means of a screw with an Acme thread. The feed, which is intermittent with every revolution of the turntable, is actuated, in the known manner, by means of a star wheel. For the return movement of the feed, a second hydraulic motor is arranged on the turntable, which, in the manner of a power transmission, is connected to the Acme-thread screw of the tool holder by a roller. To initiate the return movement of the tool holder upon conclusion of the cutting sequence, a limit switch is rigidly mounted on the housing and one movable vernier-like straightedge is attached to the tool holder. The limit switch controls the hydraulic motor of the tool holder via a selector valve, whilst stopping of the motor is effected by an oil-hydraulic pressure switch. To initiate the return movement of the tool holder in case of overloads, a second oil-hydraulic pressure switch is arranged in the hydraulic circuit of the turntable drive, which in turn actuates the selector valve of the hydraulic motor for the tool holder. Arranged at a right angle to the direction of the feed of the tool holder, is a tool ram with the cutting tool, which is adjusted manually by means of an Acme-threaded screw. To generate the ram feed in the direction of the rotating axis, for feed and return movement which is intermittent with every revolution of the turntable, a hand-operated two-way trip dog is attached on the housing, actuating a star wheel located on the Acme-threaded screw. Actuation of, and exertion of hydraulic pressure onto, the forenamed hydraulic components, is performed by a portable hydraulic unit, as known per se, which is coordinated wih the special lathe.

EXAMPLE OF DESIGN

The invention is to be explained more closely below using an example of the design. The relative drawings show in FIG. 1 the special lathe in operating position FIG. 2 the clamping system of the intermediate flange, FIG. 3 the tool holding system FIG. 4 a partial illustration of the hydraulic system FIG. 5 a two-way trip dog as detailed to FIG. 3.

Figure 2:
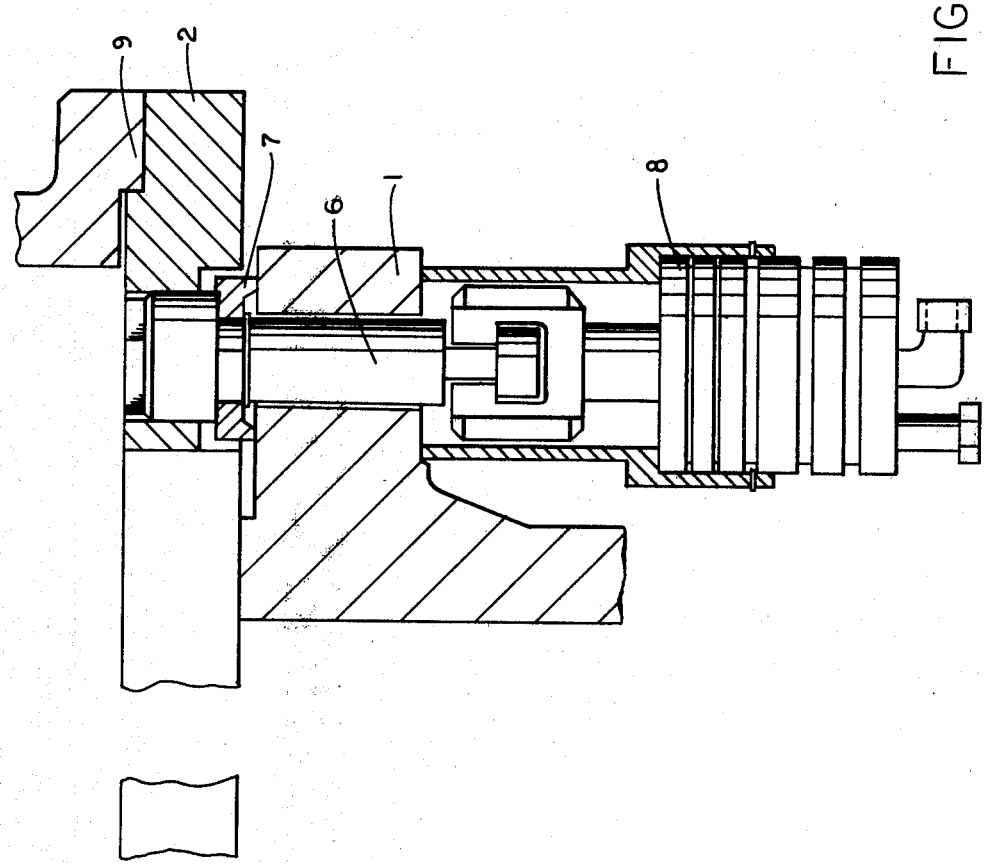

In the example of the design, a deformed flange sealing-face with a diameter of 1,500 mm is to be machined. For this purpose the portable individual systems, namely the intermediate flange 2 with a clamping system 3, the machine 4 by special transporter, and the hydraulic unit 5, are brought to the site, and by using hoisting tackle, are assembled into a lathe directly at the work piece, as shown in FIG. 1.

Herein the intermediate flange with the clamping system, is set upon the flange to be machined. Adjusting of the intermediate flange to the work piece is then made by turning the spacer bolts 6 screwed into the intermediate flange, whereby the spacers 7 will rest on the work piece. This can be seen particularly from FIG. 2. After completion of adjusting, the work piece to be machined is connected to the intermediate flange by the hydraulic clamping cylinder 8, applying pressure in two controlled stages. To geometrically fix the intermediate flange to the machine, the common mating surfaces are paired against a centering flange 9 as well as fastened by bolts, so that the special lathe is now in operating position. The machine is designed with rotational symmetry and constructed with a cast, light metal, cylindrical housing within which the further components, namely the main drive 10, the rotating turntable 11 with the main shaft, the drive shaft support 12 and the tool holder 11 with the hydraulic motor are arranged.

Figure 3:
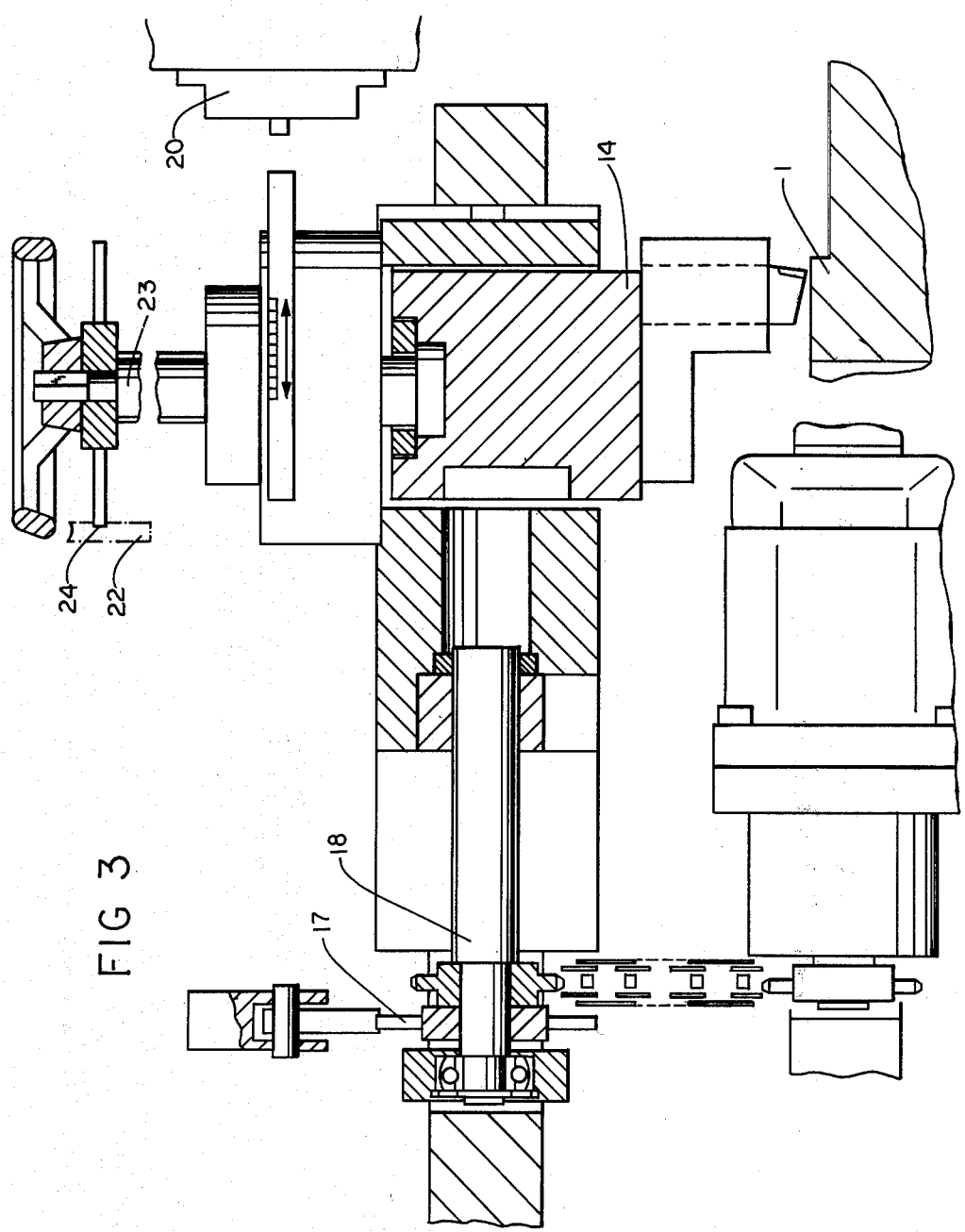
Figure 4:
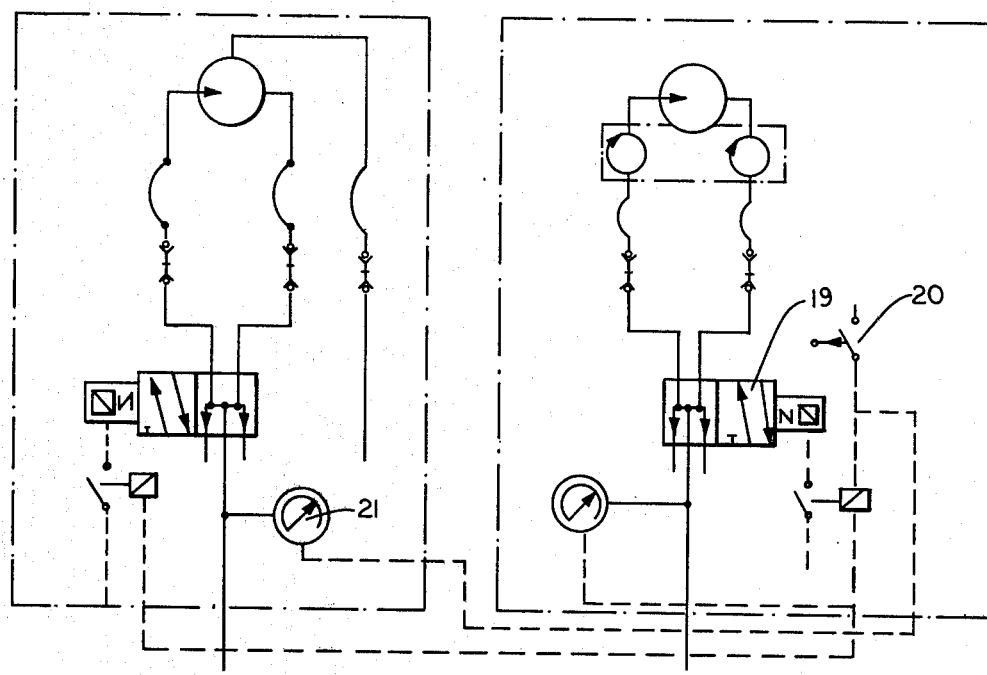
Figure 5:
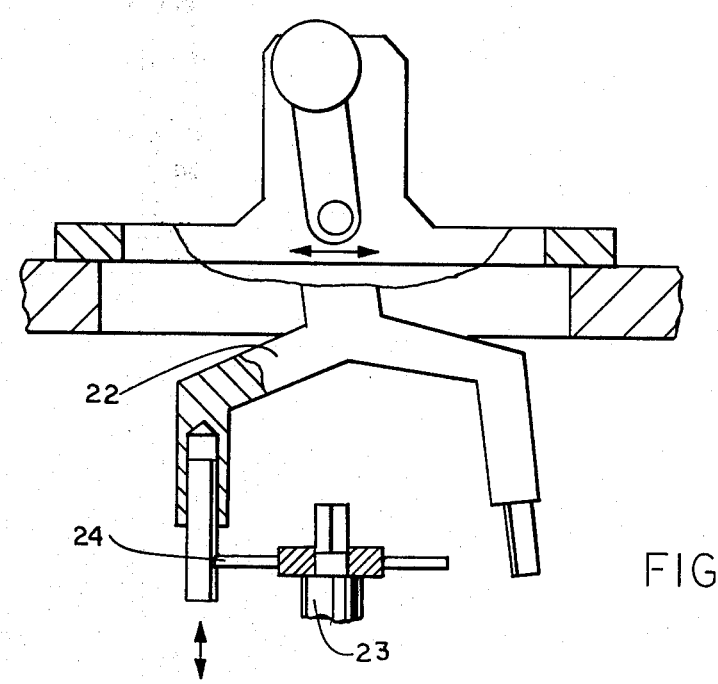

The equipment, now in operating position, is to be readied for work according to the geometrical requirements imposed by the work piece, by radially moving the tool holder and manually setting the ram 14 with the cutting tool in the direction of the axis of rotation. The holding system is shown in FIG. 3. Machining begins with putting into operation the main shaft 10 which will cause rotation of the turntable by means of a mechanical gear train 15. Support of the turntable with the drive shaft is at the side of the housing by spring-loaded tapered roller bearings in dual arrangement. The radial feed movement of the tool holder is effected, intermittent with every revolution of the turntable, by the stepwise partial movement of a star wheel 17, and the partial movement of the Acme-threaded screw 18 resulting therefrom. On conclusion of the respective cutting sequence, return of the tool holder, already prior to the termination of the rotation of the turntable, is by tripping a limit switch 20, which is travel-operated and which actuates the selector valve 19 for the supply of the hydraulic motor. Upon unforeseen loads caused by blunting of the cutting tool or by too great a chip volume an oil-hydraulic pressure switch 21 will actuate subordinate elements for the return of the tool holder and the stopping of the main drive. The part of the hydraulic equipment relative to these switching sequences is shown in FIG. 4.

Machining of the outer diameter of a projection of the sealing face ensues by the ram feed actuating a two-way trip dog 22 which in turn moves the star wheel 24 attached to the Acme-threaded screw 23, intermittent with every revolution of the turn table. This can be seen from FIG. 5. The advantages of chip-removing cutting of flange seal faces with portable turning equipment are realized on repair tasks for non-removable large components, or in such cases respectively, where removal would be impractical for other reasons. Technologically, reworking of damaged seal faces fabricated by deposition welding, or of welded-on flanges, can be accomplished with the special lathe. Apart from avoiding removal and subsequent reinstallation of large components, which would be tied to an inordinate expenditure, including the related problems of safety engineering, components which have been reworked when in their installed position are thus available for a considerably longer period of service.

We claim:

1. A portable lathe for machining sealing faces on flanges of work pieces having relatively large diameters and not removed from their location, comprising a machine unit and a hydraulic unit; said machine unit including a housing with a centering flange, a main drive, a rotatary turntable operatively connected to said drive, and a tool holder provided with a hydraulic motor; an intermediate flange positioned between the workpiece and said turntable and including a stepped-like flange surface coordinated with said centering flange, said intermediate flange being formed with a plurality of circumferentially distributed threaded holes; and a clamping system for connecting the workpiece to said intermediate flange, said clamping system including a plurality of bolts having external threads threaded into said threaded holes and each formed with a circumferential groove, a plurality of spacers each mounted in the respective groove of the respective bolt, and a plurality of hydraulic clamping cylinders connected to said bolts for adjustably coupling said intermediate flange to the workpiece.

2. The portable lathe of claim 1, wherein said housing is cylindrical and formed of light-metal casting.

3. The portable lathe of claim 2, including a drive shaft support mounted in said housing.

4. The portable lathe of claim 3, wherein each of said hydraulic clamping cylinders is located in a T-shaped slot located below a flange of the workpiece.

5. The portable lathe of claim 4, wherein said each of said hydraulic cylinders is provided with a clamping sleeve rigidly mounted thereon.

6. The portable lathe of claim 5, wherein said tool holder and its hydraulic motor are mounted on said turntable, the feeding movement of said tool holder being effected intermittent with every revolution of said turntable.

7. The portable lathe of claim 6, wherein said tool holder carries a cutting tool mounted to a tool ram.

8. The portable lathe of claim 7, including means for feeding movement of said tool holder, said feeding means including a star wheel and an Acme-threaded screw operatively connected thereto, said screw being operatively connected to said ram, and means for the return movement of said tool holder, said return means being operative upon conclusion of the respective cutting sequence and including a limit switch rigidly mounted on said housing, a movable straight edge attached to said tool holder and cooperating with said limit switch, a selector valve operatively connected to said limit switch, and a first oil hydraulic pressure switch connected to said switch limit for controlling said hydraulic motor, and a second oil-hydraulic pressure switch with which said selector valve is coordinated, said second oil-hydraulic pressure switch being operative for the initiation of the return movement of said tool holder in case the overloads occur in said hydraulic unit.

9. The portable lathe of claim 8, further including a manually operated two-way dog arrangement mounted on said housing, said dog arrangement including a trip dog, a star wheel and an Acme-threaded screw connected thereto, said dog arrangement being operative for generation of the movement of said ram in a direction of feeding and return travel of said ram intermittent with every revolution of said turntable.

* * * * *